March 28, 1967   E Q. SMITH, JR., ET AL   3,311,747
INFRARED HORIZON SENSOR FOR MISSILE ATTITUDE CONTROL
Filed Dec. 31, 1963   4 Sheets-Sheet 2

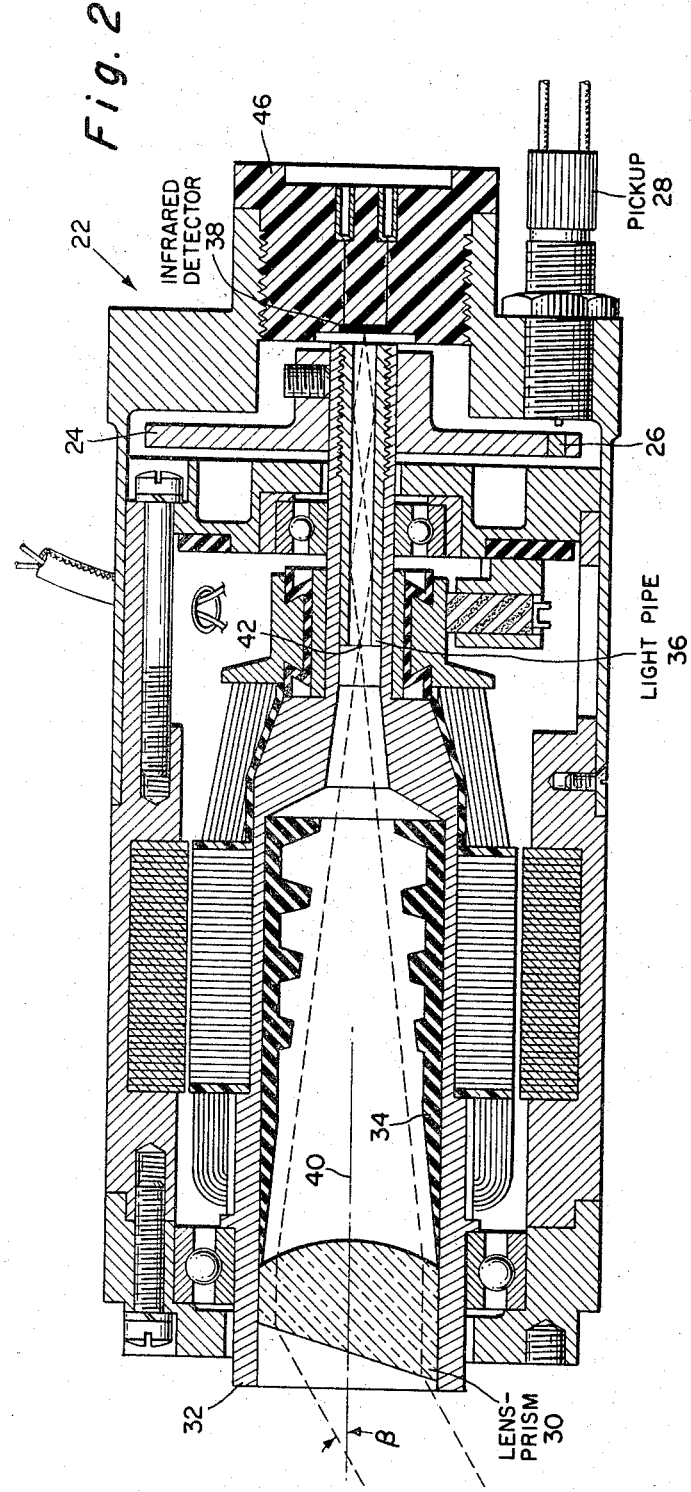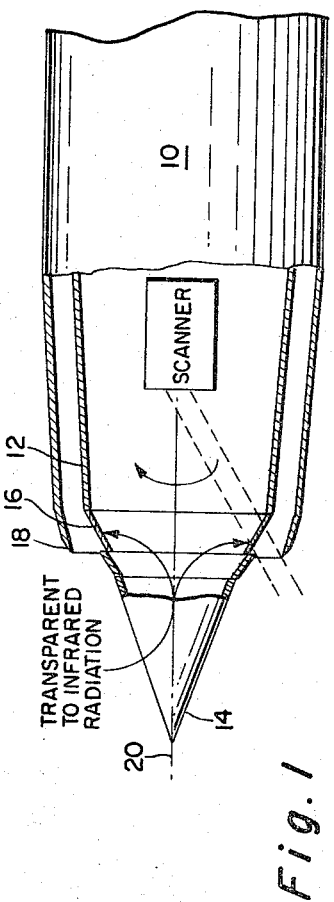

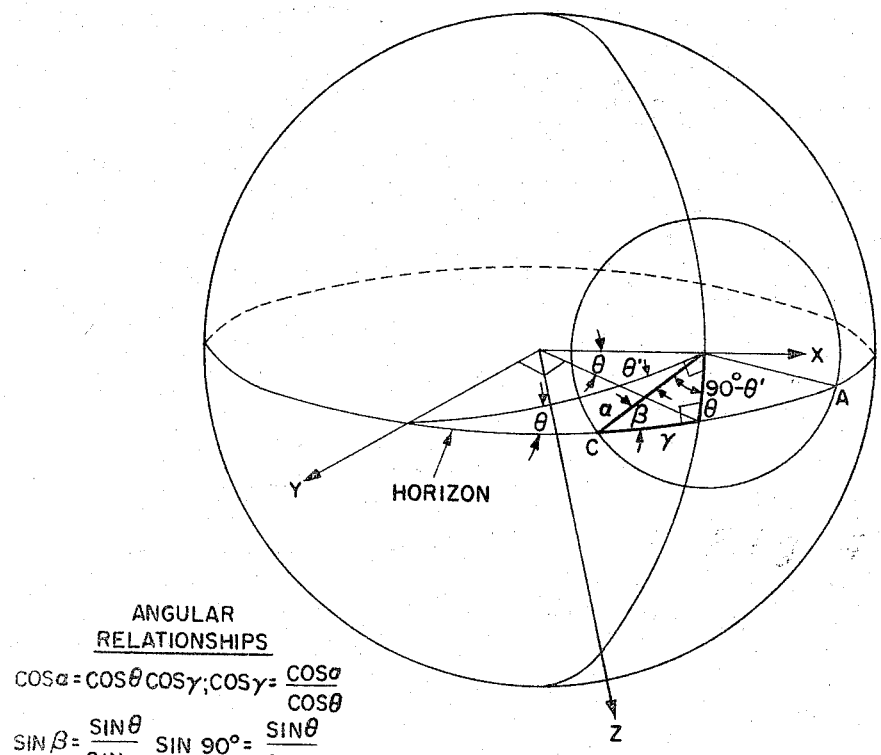

ANGULAR RELATIONSHIPS $\cos\alpha = \cos\theta \cos\gamma; \cos\gamma = \dfrac{\cos\alpha}{\cos\theta}$ $\sin\beta = \dfrac{\sin\theta}{\sin\alpha} \sin 90° = \dfrac{\sin\theta}{\sin\alpha}$ $\cos(90°-\theta') = \sin\beta \sin 90° \cos\gamma$ $\sin\theta' = \dfrac{\sin\theta}{\sin\alpha} \dfrac{\cos\alpha}{\cos\theta} = \dfrac{\tan\theta}{\tan\alpha}$ $\theta = \tan^{-1}(\tan\alpha \sin\theta')$

Fig. 6

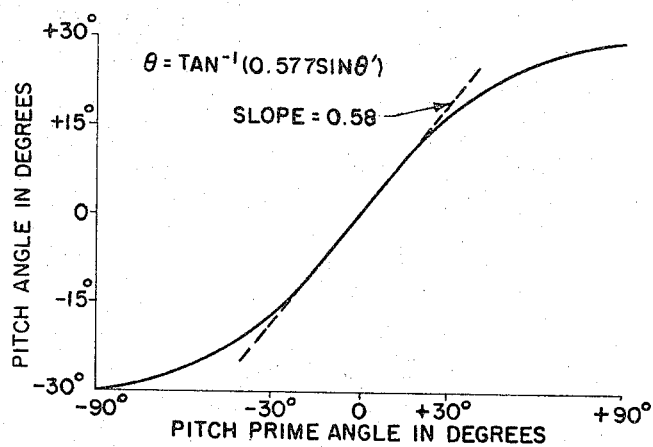

Fig. 7

United States Patent Office

3,311,747
Patented Mar. 28, 1967

3,311,747
INFRARED HORIZON SENSOR FOR MISSILE ATTITUDE CONTROL
E Quimby Smith, Jr., Camarillo, and Milton R. Marson, Warren W. Hewitt, and Webster L. Hage, Oxnard, Calif., assignors to the United States of America as represented by the Secretary of the Navy
Filed Dec. 31, 1963, Ser. No. 334,946
7 Claims. (Cl. 250—83.3)

The invention described herein may be manufactured and used by or for the Government of the United States of America for governmental purposes without the payment of any royalties thereon or therefor.

The present invention relates to a system for measuring the pitch and roll attitude of a missile by detecting differences in the amount of infrared radiation present across the horizon.

Many types of missiles are controlled during at least a portion of their flight by signals either pre-programmed into a built-in guidance system or else received by the missile from an exterior source. Variations in these signals bring about changes in the position of the missile's aerodynamic control surfaces and consequently determine the path which the missile will follow toward its target. However, unless the attitude of the missile is known at the time this control operation is carried out, there can be no assurance that the movement of any particular aerodynamic surface in response to a received command will actually result in the missile following the intended course. Hence, some means is necessary to sense the orientation of the projectile, especially in its pitch and roll planes, and deviations, if any, from established references in such planes employed to modify the respective guidance signals such that the intended path of the missile will actually be followed.

It is possible to "reference" the missile during flight by incorporating therein a vertical gyro, but, since this device must be of considerable size and weight, it is obvious that the range and maneuverability of the missile are restricted to at least a certain degree. Furthermore, a gyro has complex power requirements, and is subject to drift errors due to acceleration.

It would be highly desirable to provide a system for missile guidance in which the necessity for employing such a gyro is no longer present. This would not only overcome the above drawbacks, but in addition would materially reduce the overall cost of the projectile as well as adding to its reliability of operation. It is accordingly a feature of the present disclosure to provide such a system.

A basic characteristic of the present concept is the employment of an infrared sensing unit on a missile to provide information as to its instantaneous pitch and roll attitude. This is accomplished, in a preferred embodiment, by means of a device which scans a region in space toward which the missile is traveling, and detects a difference in the magnitude of the infrared radiation received from different portions of this region. More specifically, the two portions of the region thus scanned are the earth and the sky. Inasmuch as the former is relatively warm compared to the latter, the radiation received therefrom will be of greater magnitude. By comparing these difference signals with a given reference signal, the orientation of the missile with respect to the horizon can be ascertained.

The present concept is particularly, through not exclusively, designed for incorporation into a missile of the type in which the main cylindrical body is enclosed within a tubular casing of greater diameter so as to create therebetween an annular opening through which infrared radiation may be received. Such a construction is set forth, for example, in a United States patent of the co-applicant E. Q. Smith, Jr., No. 3,014,426 issued Dec. 26, 1961. In this patent, radiation is shown as passing between the main missile body and a surrounding cowl to enter the interior of the missile, where it is detected and employed for guidance purposes. In the present application, infrared energy is picked up by an optical system which lies essentially on the longitudinal axis of the missile, this optical system incorporating means for developing a scanning operation such that a full 360° angular movement thereof results.

One object of the present invention, therefore, is to provide a system for ascertaining the instantaneous pitch and roll attitude of a missile during flight.

Another object of the invention is to provide a sensing device which operates by detecting the difference in the respective magnitudes of the infrared radiation emitted by the earth and the sky while the missile is traveling toward its target.

A further object of the invention is to provide a sensing system of the type described which eliminates the necessity for employing one or more relatively complex gyros to ascertain the orientation of a missile so that the latter's command or guidance signals may be modified thereby.

Other objects, advantages, and novel features of the invention will become apparent from the following detailed description of the invention when considered in conjunction with the accompanying drawings wherein:

FIG. 1 is a simplified showing partly in section, of a missile of one type into which the sensing system of the present invention may be incorporated;

FIG. 2 is a cross-sectional view of the infrared scanning unit incorporated in the missile of FIG. 1;

FIG. 6 is a showing of the spherical geometry relating the angles set forth in FIG. 5;

FIG. 7 is a graph of the relationship between certain of the angles of FIG. 6;

Figure 3:
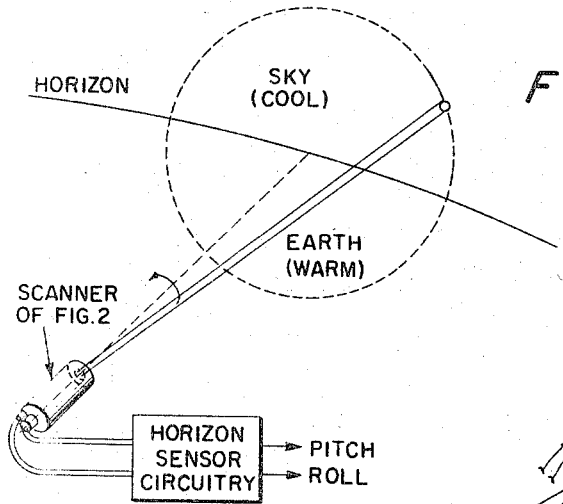
FIG. 3 is a schematic presentation of the basic concept upon which the present invention is predicated, illustrating the manner in which the apparatus of the present invention is designed to distinguish between the infrared radiation respectively emitted by the earth and the sky.

Referring now to FIG. 1 of the drawings, there is shown a missile of the type referred to in Patent No. 3,014,426 mentioned above. This missile, generally identified in the drawing by the reference numeral 10, is composed of a generally cylindrical body member 12 which terminates forwardly in a generally conical nose portion 14 an annular band 16 of which is transparent to infrared radiation. Encircling the body member 12, and spaced apart therefrom, is a tubular shell which extends inwardly at its forward edge to form a cowling 18 essentially in the manner illustrated. The spatial relationship between the cowling 18 and the transparent portion 16 of the missile nose member is such that radiation arriving along paths lying at an angle of approximately 30° to the longitudinal axis 20 of the missile will enter between the forward edge of the cowling 18 and the missile nose portion to pass through the transparent material of which the section 16 is formed to arrive at a region within the body member 12 which lies on the axis 20. As will be further brought out in connection with a description of the sensing unit of FIG. 2, these rays impinge upon a prism which forms a part of an apparatus for determining the instantaneous pitch and roll attitude of the missile. Inasmuch as the details of the propulsion and guidance system for the missile 10 form no part of the present invention, they have been omitted from the drawings for the sake of convenience of description.

In FIG. 2 is illustrated a perferred device for scanning the horizon and detecting the difference between the magnitude of the radiation emitted by the earth below and the sky above. This device of FIG. 2 incorporates an optical system, together with means for causing such system to cyclically scan the region in space toward which the missile is travelling. Incorporated in the apparatus of FIG. 2 is a scanner drive mechanism which consists of a D.C. motor having a hollow armature the dimensions of which are chosen to accommodate the mentioned optical system. The motor per se operates on conventional principles and is intended to rotate at a frequency of 120 c.p.s., which is therefore the frequency at which the optical system scans the horizon. This motor, generally identified in FIG. 2 of the drawings by the reference numeral 22, includes in the rear portion thereof a flywheel 24 which is composed of some non-ferrous material, and which has embedded therein a small mass or slug 26 of iron the purpose of which is to generate a reference pulse during each rotational cycle of the motor when the slug 26 passes by a magnetic pickup unit 28 carried by the motor housing. The pulse so generated is employed to aid in determining the roll angle of the missile 10 in a manner to be subsequently described.

The optical portion of the apparatus of FIG. 2 consists of an integral lens-prism 30, mounted within the hollow armature 32 of the motor, a light baffle 34, and, mounted within the hollow armature 32, a light pipe 36 of tubular configuration and having a highly reflective inner surface. This pipe 36 acts to conduct therethrough infrared energy picked up and focused by the lens-prism 30 to an infrared detector 38 mounted axially of the motor 22 and located in the rearmost portion thereof. The lens-prism 30 serves a dual purpose—that is, it not only acts to focus the infrared energy picked up thereby to the forward opening in the pipe 36, but also, since the exposed planar surface thereof lies at an angle to the longitudinal axis of the motor assembly, radiation arriving at a particular predetermined angle β relative to the longitudinal axis 40 of the motor (which is also the roll axis of the missile) is refracted parallel thereto as the motor armature rotates. The particular angle at which radiation is picked up by the lens-prism 30 is a function not only of the prism angle, but also of the index of refraction of the optical material at the wavelength of the impinging radiation. One material which has proven to be especially satisfactory for the unit 30 is arsenic trisulphide having an index of refraction of about 2.4. The lens-prism 30 in the example shown is cut at an angle of 18° from the normal to the axis of 40 of the scanner. This yields a resulting scan angle of 30° (with respect to axis 40) and the motor assembly 22 is consequently located within the missile 10 so that infrared energy may pass to the lens-prism 30 through the opening formed between the nose portion 14 and the forward edge of the cowling 18 (see FIG. 1). The relationship of these structural components of the missile 10 is such that, as the lens-prism 30 is rotated through a full 360° angle during each scanning cycle, the energy arriving at the missile from the horizon is scanned in circular fashion to develop an output variation from the detector 38 in accordance with variations in the amplitude of such energy.

The lens portion of the unit 30 focuses the radiation which impinges on the front surface of the prism to a point 42 on the axis 40 of the scanner, this focal point being determined by the index of refraction of the lens material as well as by the lens curvature. The apparatus of FIG. 2 has been found to operate satisfactorily when this lens has a curvature of 3.15 in., giving a focal length of 2.25 in. It has been found that the transmission efficiency of an optical unit so constructed is about 70% for radiation with a wave length between .7 micron to 11.5 microns. Below .7 micron very little radiation is transmitted by the lens-prism.

The infrared detector 38 cannot conveniently be placed at the focal point 42 of the lens-prism 30 because of practical restrictions imposed by motor design. However, the light pipe 36, which is used to transfer the infrared energy from such focal point to the infrared detector 38, imposes an energy loss of less than 25% in actual practice. This light pipe, as well as the motor, are designed so that the former readily screws into the armature of the latter. The baffle 34 is interposed between the lens-prism 30 and the light pipe 36 to minimize random radiation from reaching the infrared detector 38 via multiple reflective paths. This light baffle 34 also serves as a stop for positioning the lens-prism 30 when the latter is inserted within the hollow armature 32 during assembly of the scanner.

The infrared detector 38 is mounted in a plug 46 composed of some electrically insulating material and threaded exteriorly so as to screw into the scanner. This plug 46 can be adjusted to position the detector 38 axially with respect to the rearmost opening in the light pipe 36 in order to maximize the detector output signal. Inasmuch as the detector 38 functions to measure the difference in radiation between the earth and the sky, under good horizon conditions the output signal therefrom somewhat resembles a square wave. The lens-prism 30 has a wide infrared spectral transmission range. The spectral range of the entire scanner is primarily determined by the detector, which should also possess a fast time response. It may be of the lead sulfide type, which is sensitive only in the near infrared region up to about 2.5 microns. In this infrared region the radiation received is primarily reflected solar radiation from the earth and cloud cover. It has been ascertained that one detector of this type has a time constant of 60 microseconds, which introduces 2.5 degrees of phase lag when the motor 22 operates to produce a scanning frequency of 120 c.p.s.

When the scanner of FIG. 2 is in operation, the armature 32 rotates at the stated scanning frequency. This rotation correspondingly rotates the lens-prism 30 to cause the latter to generate a circular scan, picking up infrared energy which passes through the transparent portion 16 of the missile nose member 14. This mode of operation is illustrated in FIG. 3 of the drawings, wherein the scanning unit of FIG. 2 is shown as having its longitudinal axis 40 aligned with the horizon, such that, upon operation, the lens-prism 30 scans substantially equal regions representing the earth and the sky. Accordingly, the horizon sensor of the present invention consists of two major portions (1) the scanner of FIG. 2, which scans the horizon in the manner shown by FIG. 3 and (2) an electronic circuit to be subsequently described, which proceses the output of the scanner to generate pitch and roll attitude signals for application to the guidance apparatus.

Figure 4:
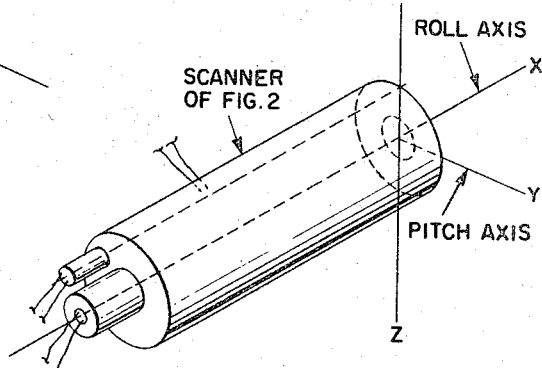
FIG. 4 is a schematic showing of the axis system upon which the scanning unit of FIG. 2 operates.

The pitch and roll attitude of the scanner is referenced to its pitch (Y) axis and the roll (X) axis. These axes are illustrated in FIG. 4 and are defined as follows: the X axis is the longitudinal axis of the scanner, the Z axis is perpendicular to the X axis and intersects the longitudinal axis of the magnetic pickup (28 in FIG. 2) and the Y axis is perpendicular to both the X and Z axes to form a right-handed axis system, the origin of this system being at the intersection of the X axis with the front surface of the scanner of FIG. 2.

Figure 5A:
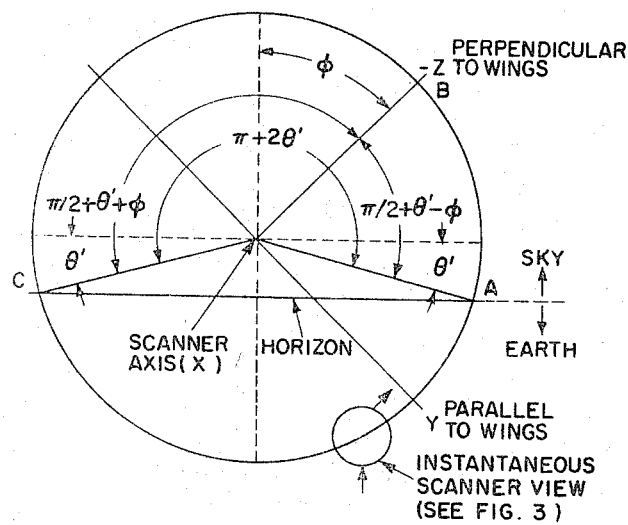
FIG. 5a is an illustration of the scanning geometry for the unit of FIG. 2.

The geometry of the scanning system of the present invention is brought out by FIG. 5a of the drawings. This figure illustrates the manner in which the pitch and roll attitude is derived from the infrared detector 38 of FIG. 2 and from the magnetic pickup 28 thereof. The viewpoint is taken as looking forward and parallel to the longitudinal or roll axis of the scanning unit. The illustration shows positive pitch and roll attitude of the scanner, or, in other words, "up" pitch and "right" roll.

The relationship between the pitch angle $\theta$ and the pitch prime angle $\theta'$ is derived from FIGURE 6 of the drawings. This relationship is given by the formula $$\theta = \tan^{-1}(\tan \alpha \sin \theta')$$

where $\alpha$ is the scan angle. When $\alpha$ is 30°, the relationship is reduced to $$\alpha = \tan^{-1}(0.577 \sin \theta')$$

In FIG. 7 the pitch angle $\theta$ is plotted against the pitch prime angle $\theta'$. The graph shows that for pitch angles up to ±15°, $\theta$ is approximately proportional to $\theta'$, or, in other words, $$\theta \cong 0.58 \theta'$$

Therefore the pitch angle $\theta$ is derived by detecting the pitch prime angle $\theta'$ from the infrared signal received by the scanning unit of FIG. 2.

Figure 5B:
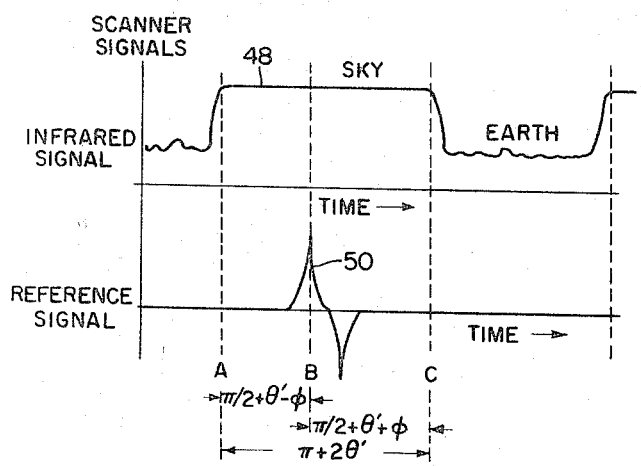
FIG. 5b illustrates waveforms of signals developed during operation of the apparatus of FIG. 2.

The roll angle of the missile is derived from the two signals developed by the infrared detector 38 and the magnetic pickup 28 of FIG. 2. These two signals are set forth in FIG. 5b, the infrared signal 48 being shown therein on the same time axis as the reference signal 50. The roll angle is obtained by deriving the phase relationship between the signals 48 and 50.

Figure 8:
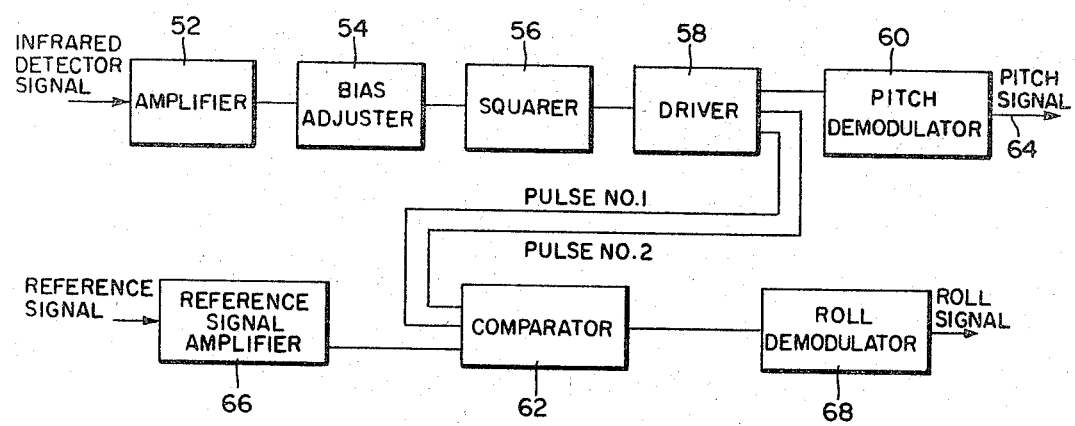
FIG. 8 is a block diagram of a preferred form of electrical network which acts to process the variations developed by the scanning unit of FIG. 2 and to yield pitch and roll signals in the output thereof.

The two signals 48 and 50 respectively present in the output of the infrared detector 38 and the magnetic pickup 28 of FIG. 2 are applied to a processing circuit, which may be of the type set forth in FIGURE 8 of the drawings. The function of this network is to generate D.C. signals proportional to the pitch and roll attitudes of the missile 10 from the respective infrared and reference signals in the output of the scanner. Although one particular set of electrical units is illustrated, it will be recognized that many alternative types of circuitry will perform substantially identical functions. The infrared detector signal 48 from the member 38 of FIG. 2 is applied to an amplifier 52 which is of more or less conventional design. This unit 52 amplifies the 120 c.p.s. signal, which may have a peak-to-peak voltage range from 4 to 80 millivolts, with no appreciable phase shift or distortion. It is desirable that the frequency response of the amplifier 52 be essentially flat from 25 c.p.s. to above 1000 c.p.s., since such a response is necessary in order to faithfully reproduce the nearly square signal 48 produced by the scanner. A representative waveform for the output of amplifier 52 is shown by the curve A of FIG. 9. It might be mentioned at this point that it is preferable for the electronic components making up the network of FIG. 8 to be transistorized and arranged in the form of modules located within the missile body member 12 and positioned circumferentially around the outer surface of the scanning unit.

Figure 9:
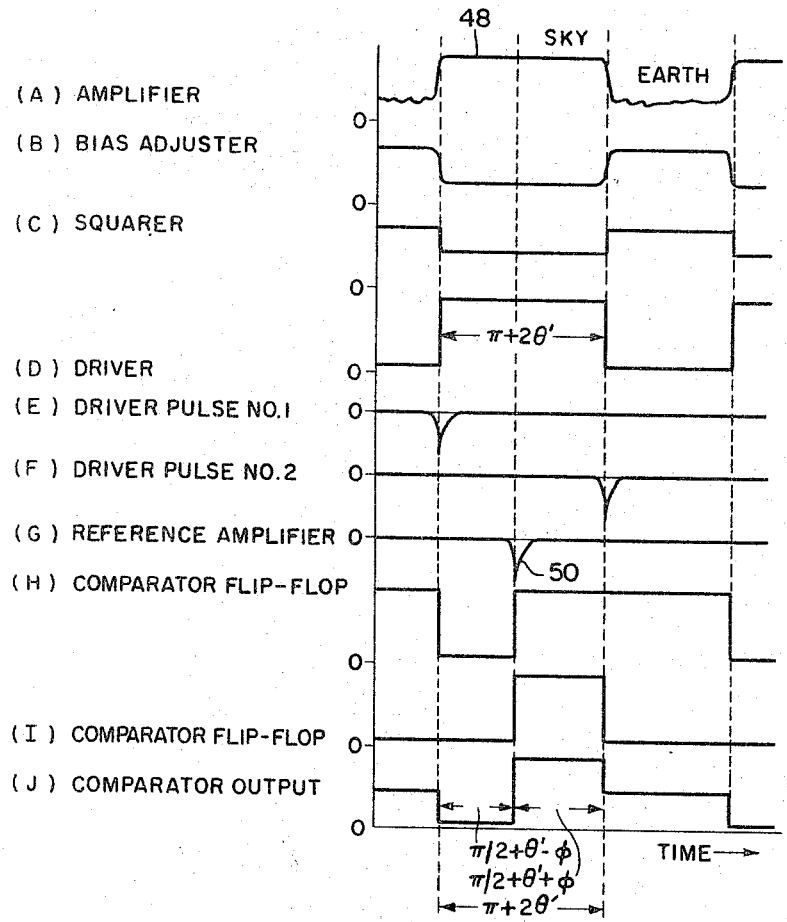
FIG. 9 is a graph of waveforms appearing at various points in the network of FIG. 8, and which serve to explain the operation of the units making up such network.

The output of amplifier 52, as represented by the wave A of FIG. 9, is applied to a bias adjuster 54 which is designed to automatically adjust the D.C. level of its output as a function of the input signal level from the amplifier. Its design is based upon the characteristics of the infrared signal developed by the scanner. Its presence is required in order for a squaring unit 56 (to which the output of the bias adjuster 54 is supplied as shown in FIG. 8) to produce a constant-pulse-width modulated output for input signal magnitudes ranging from 4 to 80 millivolts, and also to minimize premature triggering of the squarer 56 when erratic signals are received during the time that the optical unit of FIG. 2 is scanning the earth portion of its cycle. Although the circuitry of the bias adjuster 54 may be of any suitable design not known in the art, one preferred arrangement utilizes a Zener diode at its input and a plurality of amplifier stages. This Zener diode tends to keep the peak output signal voltage from the amplifier 52 below the Zener voltage. As the signal becomes larger, the lower portion thereof results in the first amplification stage of the adjuster being cut off. The phase of the signal is oriented so that the erratic (earth side) of the signal is thus eliminated as shown in curve B of FIG. 9. This action reduces the D.C. voltage level of the bias adjuster output whereby the squarer 56 operates near the cleaner, sky side of the signal at all times.

It has been found in practice that the bias adjuster 54 should preferably have a gain of about 10. Although some characteristics of the squarer 56 have been mentioned above, it should be noted that it possesses two stable positions or output voltage levels. A conventional Schmitt trigger circuit is particularly suitable for this purpose. The squarer 56 provides a modulated square wave output as shown in curve C of FIG. 9.

A driver circuit 58 receives the output of the squarer 56. This circuit 58 may be of the more or less standard "flip-flop" type, providing a large-amplitude pulse-width-modulated signal to drive a pitch demodulator 60. The signal from the driver 58 (curve D of FIG. 9) is modulated with a the pitch prime angle signal, the driver 58 generating pulses which coincide with the horizon transistions to drive the comparator 62 of the roll network these pulses generated by the driver 58 being illustrated by the waveforms E and F in FIG. 9. The output of the pitch demodulator 60, as it appears in the conductor 64, is suitable for direct application to the guidance system of the missile 10 to modify such system in accordance with the missile's instantaneous pitch attitude.

Also shown in FIG. 8 is a roll network which includes the comparator 62 mentioned above. The reference signal derived from the magnetic pickup 28 of FIG. 2 is applied to a reference signal amplifier 66 which amplifies the positive portion of the signal 50 (FIG. 5b) to drive the comparator 62. The negative portion of the signal is rejected by the unit 66.

The comparator 62 generates pulse-width-modulated signals as shown in curve J of FIG. 9. These signals are effectively modulated by roll angle information only because the pitch information is canceled when the signal is demodulated. The comparator 62 preferably consists of two "flip-flops" and a summing network, each of which may be of a standard type. One of these flip-flops is turned off by one pulse from the driver 58 (curve E in FIG. 9) and then on by the reference pulse curve G in FIG. 9. The other flip-flop making up the comparator 62 is turned on by the reference pulse 50 and then off by the second pulse signal from the driver 58 (curve F in FIG. 2). The respective flip-flop signals are illustrated in FIG. 9 by the curves H and I. These two signals are then summed to give the comparator output as shown in curve J. In practice, the amplitude of this comparator output is in the neighborhood of 20 volts.

The output of the comparator 62 is applied to a roll demodulator 68. Both this unit 68, as well as the pitch demodulator 60 of the pitch network, convert the pulse-width-modulated signals from the comparator 62 and the driver 58, respectively, to D.C. signals proportional to the missile's pitch and roll attitudes. Both of the demodulators 60 and 68 are identical and are basically conventional low-pass filters each with a very sharp cut off slope. Furthermore, each demodulator 60 and 68 passes frequencies up to about 10 c.p.s. with a minimum of phase lag and attenuates the 120 c.p.s. carrier frequency by about 56 db. Each demodulator preferably includes two second-order, less than critically damped, lag circuits with natural frequency of 23 c.p.s. The low damping is desirable to minimize the phase lag at low pitch and roll frequencies. The cutoff slope of each demodulator should be about 80 db per decade, in order to reduce the 120 c.p.s. noise output to about 40 millivolts peak-to-peak as far as pitch is concerned and to about 20 millivolts peak-to-peak with respect to roll. The noise outputs are respectively equivalent to about ¼° of pitch and ½° of roll. It should be noted, however, that the pitch and roll sensitivities from the demodulators 60 and 68 are functions of the respective amplitudes of the driver and comparator signals. These sensitivities are respectively 0.19 volt per degree for pitch and 0.052 volt per degree for roll.

The system above described is approximately linear for pitch angles between ±25°, and for roll angles between ±90°. The pitch sensitivity is 0.193 volt per degree and the roll sensitivity is 0.052 volt per degree. With respect to the cross-coupling between pitch and roll, it has been ascertained that the sensitivity of the pitch cross-coupling is 0.0038 volt of roll signal per degree of pitch angle. No measurable roll cross-coupling into the pitch signal is evident.

The amplitude ratio of the pitch signal to pitch angle is approximately constant for frequencies less than about 10 c.p.s. The phase lag of the pitch signal is low enough at frequencies up to about 7 c.p.s. to be satisfactory for a vertical reference in the autopilot of a high-performance missile. In fact, the phase lag of the sensor of FIG. 2 is comparable to that of a good autopilot rate gyro.

Operation of the apparatus herein described brings out that the system frequency is approximately 20 c.p.s. and that the damping ratio is about 0.3. Inasmuch as the step pitch input to the sensor of FIG. 2 yields a response time of about 0.08 second, the frequency response characteristics of the sensor are in agreement with this step response figure.

The scan frequency noise on the pitch and roll signals represents approximately ¼° of pitch and ½° of roll. This is based upon measured noise levels and pitch and roll sensitivities.

Extensive tests made with the invention apparatus have shown that useful information can be obtained as to the infrared characteristics of the horizon at altitudes from 20,000 to 40,000 feet, at headings from 0 to 360°, and at various times of the day, including both morning and afternoon. Tests also show that the pitch and roll signals from the sensor of FIG. 2 follow the gyro signals, or the scanner pitch and roll attitudes, quite well. Certain minor biases between the sensor signals and the sensor attitudes are apparent, however, these biases being caused primarily by two factors (1) the scanner "sees" a horizon at a different attitude than the visible horizon, and (2) the demodulators 60 and 68 of FIG. 8 drift slightly because of temperature changes. The amount of this bias attributable to each of these sources is not constant and depends upon operating conditions. Furthermore, an additional bias is inherent in pitch because the horizon is below the horizontal due to the altitude of the sensor. The overall bias, however, is constant within about 2° in pitch and 3° in roll for all operations when the received infrared signal is of adequate amplitude to cause the sensor to operate satisfactorily. The infrared signal received by the sensor is furthermore affected to a considerable degree by cloud conditions on or near the horizon. It has been found that heavy or thick clouds generally give much stronger infrared signal than the earth.

Extensive operation of the apparatus described above indicate that the invention concept is feasible as a vertical reference in a high-performance autopilot. The efficiency of the system is limited primarily by the design of the detector itself. Detectors of the lead sulfide type operate satisfactorily, but only pick up radiation in the near infrared region. This is mostly reflected solar radiation and, because any clouds which may be present act as reflectors, the amount of infrared energy received is highly dependent upon the cloud cover. Reliability of the sensing unit may be greatly improved by employing detectors in the optical portion of the system which are capable of detecting radiation at different wave lengths, either with or without an accompanying filter. Still further, with an increase in optical efficiency, the scanning unit of FIG. 2 can be reduced in size and/or weight by forming the diameter or aperture of the lens-prism 30 smaller. Also the pitch angle limits of the sensor can be increased by correspondingly increasing the scan angle of the lens-prism 30. With respect to the electronic network of FIG. 8, the frequency response of the system can be improved without affecting the signal-to-noise ratio by employing detectors having a high response, since this permits an increase in the scan frequency.

The infrared horizon sensor of the present disclosure has a number of advantages as a vertical reference over the conventional vertical gyro. The total weight and size of the sensor is only about one-half that of a light weight gyro, not including the inverter which is usually required to furnish the gyro power. The sensor of the present disclosure, in a preferred embodiment, requires only 24 volts of D.C. power, thereby eliminating the need for power conversion. Furthermore, the sensor is not subject to drift of its vertical reference as frequently occurs with a gyro, and this is particularly important when the system is employed in an acceleration environment. Finally, the cost of producing the sensor is several times less than that of a vertical gyro.

The only considerations to be taken into account when the system of the present invention is utilized are (1) a view of the horizon is required, which limits the location of the sensor on a missile or other airborne vehicle, (2) the sensor has a limitation in pitch because of the scan angle, and (3) the system actually used is limited to daytime and fair-weather operation. This latter limitation, however, may be overcome with refinements in the optical system and/or the addition of suitable filters chosen in accordance with the environment to be encountered.

Obviously many modifications and variations of the present invention are possible in the light of the above teachings. It is therefore to be understood that within the scope of the appended claims the invention may be practiced otherwise than as specifically described.

We claim:
1. Apparatus for employment on an airborne vehicle for determination of its pitch and roll attitude during flight, said apparatus including:
   an infrared detector carried by said vehicle and positioned to intercept infrared energy arriving from a region in space which includes the horizon;
   means for deriving a cyclically-recurring output data signal having one amplitude indicative of that portion of said region lying above the horizon and another amplitude indicative of that portion of said region lying below the horizon;
   means for deriving a reference signal representative of a point in each cycle of recurrence of said data signal, said reference signal extending in both directions of polarity;
   a pitch signal demodulating network receiving the output data signal derived by said first-mentioned means;
   a roll signal demodulating network receiving the reference signal derived by said second-mentioned means;
   said pitch signal demodulating network including an amplifier operating with a minimum of phase shift or distortion and having an essentially flat frequency response;
   said pitch signal demodulating network also including a bias adjustor to which the output of said amplifier is applied, said adjustor acting to cut off the irregular part of said data signal representing the earth portion of each cycle;
   said pitch signal demodulating network also including a squaring circuit having two output voltage levels each of which is determined by the amplitude of the input voltage at any given instant of time, said squaring circuit acting to provide a modulated square wave output from the signal input from said bias adjustor;
said pitch signal demodulating network also including a driver in the form of a flip-flop circuit acting to develop a large-amplitude-modulated signal containing pitch information, and also to generate pulses coincident with the transitions between earth and sky;
said roll signal demodulating network including a reference signal amplifier which acts to receive the roll signal derived by said second-mentioned means and to amplify such signal, said reference signal amplifier also acting to restrict the said roll signal to that portion thereof which extends in a single direction of polarity;
said roll signal demodulating network also including a comparator operating to generate a pulse-width-modulated signal which is effectively modulated by the roll angle of said vehicle, said comparator network incorporating a pair of flip-flop units and a summing circuit, one flip-flop unit being turned off by a pulse from the driver of said pitch signal demodulating network and then turned on by a pulse from the reference signal amplifier, the other flip-flop unit being turned on by a pulse from the reference signal amplifier and then turned off by a pulse from said driver, the summing network acting to combine the two flip-flop signals so that they are suitable for subsequent demodulation; and
a pair of pitch and roll demodulators respectively acting to convert the pulse-width-modulated signals from both the driver of the pitch network and the comparator of the roll network to D.C. form, each of said demodulators being in the nature of a low-pass filter having a very sharp cutoff slope and passing the input signal with a minimum of phase lag and substantially less than critical damping, each of said demodulators also acting to materially reduce the degree of noise present in the input signal and to yield output signals respectively proportional to the pitch and roll attitude of the airborne vehicle.

2. An attitude-determining system designed for incorporation into a missile possessing a longitudinal axis, said missile having in the forward body portion thereof an annular section which is permeable to infrared radiation, said system comprising:
a scanning device carried by said missile, said scanning device including a motor mounted so that its axis of rotation coincides with the longitudinal axis of said missile, said motor having a hollow armature;
a rotatable optical element located within the hollow armature of said motor, said optical element being so designed as to continuously intercept infrared radiation passing through the said permeable section of the missile body portion when said optical element is rotated;
said optical element being in the form of a lens-prism having a planar prism surface lying at an angle from the normal to the said missile's longitudinal axis, said lens-prism also incorporating a lens portion to focus the infrared radiation intercepted on the said planar prism surface to a point on the longitudinal axis of the missile during rotation of said motor; and
a detector forming part of said scanning device for receiving the infrared radiation focused by said lens-prism.

3. A system in accordance with claim 2 in which said detector is mounted within the said scanning device and on the longitudinal axis of said missile but in a location rearwardly of the point to which the infrared radiation is focused by said lens-prism, and a tube, mounted within the hollow armature of said motor, for conducting the infrared radiation focused by said lens-prism to said detector.

4. Apparatus designed for employment on an elongated airborne vehicle in order to determine the instantaneous pitch and roll attitude thereof, said apparatus comprising:
a sensor designed for cyclic rotation about an axis coinciding with the longitudinal axis of said elongated vehicle, said sensor including an optical system made up of a prism positioned to intercept infrared energy arriving at said vehicle from a region in space toward which the said vehicle is traveling, the face of said prism defining a plane which lies at an angle from the normal to the said longitudinal axis of said sensor;
means for cyclically rotating said sensor so that said prism scans the spatial region toward which said vehicle is traveling; and
an infrared detector forming part of said sensor and positioned on the longitudinal axis of the latter so as to receive the infrared energy intercepted by said prism;
means for focusing the energy so intercepted to a point lying on the longitudinal axis of said sensor prior to its reception by the said detector; and
a light pipe forming part of said sensor and lying in coaxial relationship with the means for cyclically rotating said sensor, said light pipe being positioned between said infrared detector and the point on said vehicle's longitudinal axis at which the infrared energy intercepted by said prism is focused.

5. An attitude-sensing device intended for incorporation into a guided missile, said device comprising:
optical means receiving infrared energy from a region in space toward which the missile is traveling, said region being divided into two portions by the horizon, so that the infrared energy received by said optical means is less from the region above the horizon than it is from the region below the horizon;
means for causing said optical means to cyclically scan the said spatial region;
means for detecting the infrared energy received by said optical means and to develop an output signal therefrom;
means for developing a reference signal during each cyclic scan of the said optical means;
and means for comparing the phase of the output signal from said detecting means with the said reference signal to yield infromation as to the instantaneous roll attitude of the missile,
said optical means being in the form of a lens-prism, and said means for causing the said optical means to cyclically scan the region in space toward which the missile is traveling being in the form of a motor having a hollow armature in which said lens-prism is located, the said lens-prism being disposed with a planar prism face, upon which the infrared energy impinges, lying at an angle from the normal to the longitudinal axis of said motor, the said lens-prism having a lens portion serving to focus the intercepted infrared energy to a point on the said longitudinal motor axis and within said hollow armature, the said detecting means also lying on the longitudinal axis of said motor but outside the hollow armature thereof.

6. A scanning device comprising:
a motor having a hollow armature;
an optical unit mounted within the hollow armature of said motor and rotatable therewith, said optical unit acting to focus radiant energy arriving at said unit from a source exterior thereto to a point on the axis of rotation of said motor;
a radiant-energy detector for receiving the energy so focused;
and means for developing a reference pulse during each cycle of rotation of said motor,
said reference pulse developing means including a magnetic pickup unit mounted on the motor housing, a non-magnetic flanged member carried by and rotating with said armature, and an element of magnetic material embedded in said flanged member and arranged to enter the vicinity of said pickup unit during each cycle of rotation of said motor.

7. A device according to claim 5 in which the said guided missile is designed with an inner body member having a substantially conical nose portion, said inner body member being enclosed within a tubular shell the forward edge of which is formed as a cowling, such cowling, together with the conical nose portion of said body member, forming an aperture of annular configuration through which infrared energy passes to be received by the said optical means, the latter being positioned on the longitudinal axis of said missile, so that the energy passing through said annular aperture will be received by the said optical means as the said lens-prism is rotated during each scanning cycle.

References Cited by the Examiner

UNITED STATES PATENTS

| | | | |
|---|---|---|---|
| 3,014,426 | 12/1961 | Smith et al. | 250—203 X |
| 3,020,407 | 2/1962 | Merlen | 250—83.3 |
| 3,093,736 | 6/1963 | McLaughlin et al. | 250—83.3 |
| 3,201,591 | 8/1965 | Froelich | 250—83.3 |

RALPH G. NILSON, *Primary Examiner.*

ARCHIE R. BORCHELT, *Examiner.*